United States Patent [19]

Tada et al.

[11] 4,234,392

[45] Nov. 18, 1980

[54] OIL SOLUBLE PHOTOGRAPHIC COUPLER RECLAMATION PROCESS

[75] Inventors: Sugihiko Tada; Kazuhiko Yanagihara; Jun Arakawa, all of Minami-ashigara, Japan

[73] Assignee: Fuji Photo Film Co., Ltd., Minami-ashigara, Japan

[21] Appl. No.: 927,202

[22] Filed: Jul. 24, 1978

[30] Foreign Application Priority Data

Aug. 3, 1977 [JP] Japan .................................. 52-93231

[51] Int. Cl.$^2$ .......................... B01D 3/12; G03C 1/08

[52] U.S. Cl. ........................................ 203/91; 203/39; 430/449

[58] Field of Search ............. 96/50 A, 55, 100, 119 R; 203/91, 94, 39, 29, 43; 202/205, 176; 430/449

[56] References Cited

U.S. PATENT DOCUMENTS

| | | | |
|---|---|---|---|
| 2,406,421 | 8/1946 | Wollner et al. | 202/205 |
| 2,446,997 | 8/1948 | Brewer et al. | 202/205 |
| 3,458,574 | 7/1969 | Anselm et al. | 96/55 |
| 3,496,065 | 2/1970 | Russell | 435/270 |
| 3,655,753 | 4/1972 | Cooley | 96/55 |
| 3,915,712 | 10/1975 | Herzhoff et al. | 202/205 |
| 4,053,066 | 10/1977 | Tkac et al. | 202/205 |

*Primary Examiner*—Wilbur L. Bascomb, Jr.
*Attorney, Agent, or Firm*—Sughrue, Rothwell, Mion, Zinn and Macpeak

[57] ABSTRACT

A process for reclaiming a photographic coupler from an aqueous oil-in-water emulsion of a coupler solvent oil having an oil-soluble photographic coupler dissolved therein comprising separating the coupler solvent oil containing the photographic coupler dissolved therein from the aqueous oil-in-water emulsion, and subjecting the separated coupler solvent oil containing the photographic coupler dissolved therein to a high vacuum molecular distillation whereby only the coupler solvent oil is removed as a distillate.

10 Claims, No Drawings

OIL SOLUBLE PHOTOGRAPHIC COUPLER RECLAMATION PROCESS

BACKGROUND OF THE INVENTION

1. Field of the Invention

This invention relates to a method of reclaiming photographic couplers from an aqueous emulsified dispersion which contains photographic couplers dissolved in a low-volatile organic solvent (hereinafter referred to as coupler solvent oil) or from a coating waste containing such an emulsified dispersion. Both emulsified dispersions and coating wastes containing emulsified dispersions are hereinafter referred to as emulsions for simplicity.

2. Description of the Prior Art

As is quite well known in the art, a photographic coupler is dissolved in a low-volatile organic solvent and the resultant solution is dispersed into an aqueous hydrophilic colloid solution, e.g., an aqueous gelatin solution, which is then used to produce a layer in a light-sensitive photographic material.

From an industrial standpoint, desirably a coupler reclaiming method must be able to provide couplers which exhibit the same photographic characteristics as those initially provided by couplers with a reasonable cost of reclamation. The latter condition self-evidently means a high reclamation efficiency.

In order to reclaim a coupler dissolved in a coupler solvent oil, it is necessary to separate the coupler from the coupler solvent oil. In the past, however, no methods are known for such a separation which can be conducted with a high efficiency. Accordingly, coupler reclamation has been economically unprofitable, and rather than reclaim the couplers dissolved in a coupler solvent oil, the mixture has always been discarded.

SUMMARY OF THE INVENTION

Thus, an object of the present invention is to provide a method of reclaiming a photographic coupler which is capable of substantially completely separating the coupler solvent oil from the photographic coupler.

Another object of the present invention is to provide a method of reclaiming a photographic coupler with a high efficiency from an emulsified dispersion which contains an oil-soluble photographic coupler in the form of a solution in the coupler solvent oil.

Accordingly this invention provides a process for reclaiming a photographic coupler from an aqueous oil-in-water emulsion of a coupler solvent oil having an oil-soluble photographic coupler dissolved therein comprising separating the coupler solvent oil containing the photographic coupler dissolved therein from the aqueous oil-in-water emulsion, and subjecting the separated coupler solvent oil containing the photographic coupler dissolved therein to a high vacuum molecular distillation whereby only the coupler solvent oil is removed as a distillate.

DETAILED DESCRIPTION OF THE INVENTION

As described above, the invention has been achieved by applying a high vacuum molecular distillation to an oily mixture containing an oil-soluble photographic coupler whereby the coupler solvent oil is separated as a distilate from the oily mixture having the oil-soluble photographic coupler as a residue.

Using such an operation the oil-soluble photographic coupler has been separated substantially completely from the couplter solvent oil, thus making coupler reclamation economically viable, since the coupler can be reclaimed with a high yield.

For a clear separation by molecular distillation, a difference in molecular weight of about 50 or more between the photographic coupler and the coupler solvent oil is satisfactory, more preferably 100 or more. More particularly, as long as the molecular weight of the photographic coupler is larger than that of the coupler solvent oil by about 50 or more, the method of the present invention is applicable with no further requirements or limitations on the nature of the coupler and the coupler dissolving oil involved.

This invention also makes it possible to reclaim not only couplers but other hydrophobic photographic additives dissolved in coupler solvent oils. Such hydrophobic additives to be reclaimed should also have a molecular weight difference of 50 or more over the coupler solvent oil.

Specific examples of coupler solvent oils to which the present invention is applicable include those less-volatile organic solvents e.g., having a vapor pressure at 150° C. of 1.1 mmHg or less, for couplers, for example, as described in U.S. Pat. No. 2,322,027, such as, for example alkyl phthalates (dibutyl phthalate, dioctyl phthalate, etc.), phosphoric acid esters (diphenyl phosphate, triphenyl phosphate, tricresyl phosphate, dioctyl butyl phosphate, etc.), benzoic acid esters (e.g., octyl benzoate), alkylamides (e.g., diethyllaurylamide), etc.

Yellow couplers to which the present invention is applicable include those yellow couplers described in, e.g., U.S. Pat. No. 3,875,057, 3,265,506, 3,408,194, 3,551,155, 3,582,322, 3,725,072 and 3,891,445, German Pat. No. 1,547,868, German Pat. Applications (OLS) No. 2,213,461, 2,219,917, 2,261,361, 2,263,875 and 2,414,006, etc. which are soluble in one of the coupler solvent oils mentioned above.

Magenta couplers to which the present invention is applicable include those magenta couplers described in, e.g., U.S. Pat. Nos. 2,600,788, 2,983,608, 3,062,653, 3,127,269, 3,311,476, 3,419,391, 3,519,429, 3,558,319, 3,582,322, 3,615,506, 3,834,908 and 3,891,445, German Patent 1,810,464, German Patent Applications (OLS) No. 2,408,665, 2,417,945, 2,418,959, and 2,424,467, Japanese Patent Publication No. 6031/1965, etc., which are soluble in one of the coupler solvent oils described above.

Cyan couplers to which the present invention is applicable may be phenol or naphthol derivatives and include those cyan couplers described in e.g., U.S. Pat. Nos. 2,369,929, 2,434,272, 2,474,293, 2,521,908, 2,895,826, 3,034,892, 3,311,476, 3,458,315, 3,476,563, 3,583,971, 3,591,383 and 3,767,411, German Patent Applications (OLS) No. 2,414,830 and 2,454,329, Japanese Patent Application (OPI) No. 59838/1973 (The term "OPI" as used herein refers to a "published unexamined Japanese patent application".) etc., which are soluble in one of the coupler solvent oils cited above.

An emulsified dispersion from which a photographic coupler can be reclaimed by the method of the present invention is an oil-in-water type emulsion comprising a coupler solvent oil containing a photographic coupler dissolved therein which is dispersed in an aqueous hydrophilic colloid, e.g., gelatin, solution generally with the aid of a surface active agent.

Such an emulsion can further contain silver halide grains as well as various photographic additives usually employed for the manufacture of photographic light-sensitive materials, since these ingredients, in general, do not interfere with the practice of the present invention.

Suitable surface active agents used for such photographic emulsions include nonionic surface active agents such as, for example, saponin (steroid type), alkylene oxide derivatives (e.g., poly(ethylene glycol), poly(ethylene glycol)/poly(propylene glycol) condensates, poly(ethylene glycol) alkyl or alkylaryl ethers, poly(ethylene glycol)esters, poly(ethylene glycol) sorbitan esters, poly(ethylene glycol) alkylamines or amides, poly(ethylene glycol)-adducts of polysiloxanes, etc.), glycidol derivatives (e.g., alkenylsuccinic acid polyglycerides, alkylphenol polyglycerides, etc.), fatty acid esters of polyhydric alcohols, alkyl esters,. urethanes or ethers or carbohydrates, etc.; anioic surface active agents with acid groups such as carboxylic, sulfo, phospho, sulfate ester, phosphate ester, etc., groups including terpenoid saponins, alkyl carboxylic acid salts, alkylsulfonic acid salts, alkylbenzene sulfonic acid salts, alkylnaphthalene sulfonic acid esters, alkylsulfonic acid esters, alkylphosphoric acid esters, N-acyl-N-alkyltaurines, sulfosuccinic acid esters, sulfoalkyl polyoxyethylene alkylphenyl ethers, polyoxyethylene alkylphosphoric acid esters, etc.; amphoteric surface active agents such as amino acids, aminoalkyl sulfonic acids, aminoalkylsulfonic acid or phosphoric acid esters, alkylbetaines, amine imides, amine oxides, etc.; and cationic surface active agents such as alkylamine salts, aliphatic or aromatic quaternary ammonium salts, heterocyclic quaternary ammonium salts such as pyridinium, imidazolium derivatives, etc., phosphonium or sulfonium salts containing aliphatic or heterocyclic groups, etc.

Detailed descriptions of these surface active agents can be found in, e.g., U.S. Pat. Nos. 2,240,472, 2,831,766, 3,158,484, 3,210,191, 3,294,540 and 3,507,660, British Pat. Nos. 1,012,495, 1,022,878, 1,179,290 and 1,198,450, Japanese Pat. application No. (OPI) 117,414/1975, U.S. Pat. Nos. 2,739,891, 2,823,123, 3,068,101, 3,415,649, 3,666,478 and 3,756,828, British Patent 1,397,218 U.S. Pat. Nos. 3,133,816, 3,441,413, 3,475,174, 3,545,974, 3,726,683, and 3,843,368, Belgian Pat. Nos. 731,126, British Pat. Nos. 1,159,825 and 1,374,780, Japanese Patent Publications No. 378/1965, 379/1965 and 13822/1968, U.S. Pat. Nos. 2,271,623, 3,288,226, 2,944,900, 3,253,919, 3,671,247, 3,772,021, 3,589,906, 3,666,478 and 3,754,924, German Patent Application (OLS) No. 1,961,638, Japanese Patent Application (OPI) No. 59,025/1975, etc.

Separation of the oily phase containing the coupler dissolved therein from an emulsion can be carried out by first decomposing the gelatin, using a gelatin peptizing enzyme, and then extracting the oily components present with the addition of a highly volatile organic solvent. The decomposition of the gelatin can be carried out at temperatures which are suitable for the enzyme used. In the case of pronase a suitable temperature for the decomposition of the gelatin is about 45° to 60° C. The extraction should be carried out at room temperature so as not to lose volatile solvent through evaporation.

Suitable volatile organic solvents which can be used include nitromethane, nitroethane, nitropropane, esters represented by the general formula $R_1COOR_2$, where $R_1$ represents a hydrogen atom, a methyl group or an ethyl group, and $R_2$ represents an alkyl group having from 1 to 5 carbon atoms. Specific examples of volatile organic solvents are esters such as methyl acetate, propyl acetate, ethyl propionate, butyl acetate, amyl acetate, propyl formate and butyl formate. In addition to these solvents, those solvents which can dissolve the oils described above and which are immiscible with or sparingly soluble in water, i.e., with the solubility in water being about 10% by weight or less, are suitable for the present purpose.

Gelatin decomposing enzymes which can be used include those commercially available under the tradenames of "Pronase P" and "Pronase E" and any gelatin decomposing enzyme set forth in Japanese Patent Application (OPI) No. 34730/1973, pp. 14 to pp. 16 (corresponding to U.S. Pat. No. 3,982,932) can be used. Suitable concentrations of and the use conditions of such an enzyme also are described in Japanese Patent Application (OPI) No. 34730/1973.

When a highly volatile organic solvent is used, such can be removed prior to the molecular distillation, at normal pressure. However, a low vacuum distillation at a temperature of about 40° to 60° C. is preferred so as to limit the exposure of couplers to heat, and to speed up the removal.

Two different types of high vacuum molecular distillation stills are known, i.e., a down-flow thin film type and a centrifugal thin film type. Both of these types can be used in the present invention. A suitable degree of vacuum ranges from about $10^{-2}$ to about $10^{-6}$ torr, and more peferably from $10^{-3}$ to $10^{-6}$ torr. A suitable temprature at which the high vacuum molecular distillation can be performed, which will depend on the molecular weight of the ingredient to be removed, are about 100°, 140° and 170° C. for compounds with molecular weights of about 300, 400 and 500, respectively, where the degree of vacuum used in $10^{-3}$ torr.

Since the molecular weights of ordinary photographic couplers lies above about 400, While the coupler solvent oil has a molecular weight not exceeding 350, a substantially complete separation of the coupler solvent oil from the coupler, e.g., to an extent that less than 5% of the coupler solvent oil remains in the residue, can be achieved under conditions of a degree of vacuum of $10^{-3}$ torr at a temperature between 130° and 140° C.

Where the weight ratio between the coupler and the coupler solvent oil is about 1:1, a single processing through a down-flow thin film type molecular still with an average period for the molecular distillation of about 3 minutes, or four successive passes through a centrifugal thin film type molecular still with a rate of about 0.5 sec/pass are sufficient to remove the coupler solvent oil to a degree of about 6% by weight of remaining rate. When the mixing ratio between the coupler and the coupler solvent oil varies from about 1:1, it is selfevidently necessary to adjust the residence time or the number of passes in proportion to the coupler solvent oil content.

The following examples are given to illustrate the present invention in greater detail. Unless otherwise indicated, parts, percents, ratios, etc. are by weight.

EXAMPLE 1

500 ml of 0.5% aqueous solution of pronase as a gelatin decomposing enzyme, was added to 10 kg of a yellow coupler containing emulsion having the composition shown in Table 1 below.

TABLE 1

| | Wt. % |
|---|---|
| α-Pivalyl-α-(5,5-dimethyl-2,4-oxazolidinedione)-N-{2-chloro-5-[γ-(2',4'-t-amylphenoxy)butyramido]phenyl}-acetanilide | 7 |
| Gelatin | 7 |
| Ethyl Acetate | 12 |
| Di-n-butyl Phthalate | 7 |
| Sodium Dodecylbenzenesulfonate | 0.5 |
| Water | 66.5 |

After the mixture was kept at 45°-50° C. under stirring for 5 hours whereby the gelatin present was peptized, 2000 ml of ethyl acetate was added. The entire volume was kept in a tightly-closed container for 12 hours to prevent vaporization of the ethyl acetate whereby the oily and aqueous phases clearly separated. The oily phase was collected and was subjected to distillation under a reduced pressure of 20 mmHg until all of the volatile ingredients were removed. Then the residue was subjected to a molecular distillation in a centrifugal thin film type molecular still (CMS-5, a product of CVC Company) with a degree of vacuum of $10^{-2}$-$10^{-4}$ mmHg, a distillation temperature of 130°-140° C. and using four passes. 610 g of the yellow coupler remained behind after complete distillation off of the coupler solvent oil to achieve a reclaiming rate of 87%.

Comparative Example

To the same quantity of the same emulsion which had been left for 5 hours after the addition of the pronase solution (0.5% aqueous solution) under stirring as described in Example 1, 1.4 l of dimethyl sulfoxide and 1.4 l of hexane were added. The mixture separated into two phases after standing 1 hour followed by sufficient stirring. The denser oily phase was poured into 7 liters of water whereby an oily layer separated. The aqueous phase was decanted off and then this washing by decantation procedure was repeated twice. By adding to the oily layer one liter of a mixed solvent comprising 6 parts by volume of n-hexane and 1 part by volume of isopropyl alcohol, the coupler crystallized in 2 hours. 300 g of coupler was obtained for a reclamining rate of 43%.

The reclaimed couplers obtained in Example 1 and in the Comparative Example both exhibited equivalent photographic characteristics as the fresh coupler when used to produce photographic materials. More specifically, in comparison with a photographic material containing the fresh coupler, the photographic material containing the reclaimed coupler showed the same photographic speed, and the same shelf life without any tendency toward increase in fog, and further, the light fastness of the developed color image was unchanged.

EXAMPLE 2

Exactly the same procedures as described in Example 1 were repeated on 10 kg of a magenta coupler containing emulsion having the composition shown in Table 2 below.

TABLE 2

| | Wt. % |
|---|---|
| 1-(2',4',6',-Trichlorophenyl)-3-(2"-chloro-5"-tridecylcarbonylamino)anilino-5-pyrazolone | 6.5 |
| Gelatin | 7 |
| Ethyl Acetate | 11 |
| Di-n-butyl Phthalate | 9 |
| Sodium Dodecylbenzenesulfonate | 0.5 |
| Water | 66 |

620 g of the magenta coupler was reclaimed corresponding to a reclamation rate of 95%. The reclaimed coupler when used to produce a photographic material exhibited equivalent photographic properties as the same magenta coupler, newly synthesized, did.

EXAMPLE 3

60 l of a mixture of emulsions ready for coating was collected from the test coating machine at the start up. To the mixture containing the emulsion shown in Tables 1 and 2 above, 40 g of pronase (powder) was added. After the decomposition of the mixture, the same procedure as described in Example 1 was followed to yield 157 g of a molecular distillation residue. The residue was dissolved in a mixture of n-hexane and ethanol (9:1 by volume) at 40° C. and cooled to 2° C., to yield a precipitate. The precipitate was filtered and dissolved again in a mixture of n-hexane and ethanol (9:1 by volume) and recrystallized. 20 g of crystals was collected and the crystals were found to be pure 1-(2',4',6'-trichlorophenyl)-3-(2"-chloro-5"-tridecylcarbonylamino)anilino-5-pyrazolone. The liquid obtained at the filtration of the first precipitate was vacuum-evaporated to yield the same residue. The residue was dissolved in a mixture of n-hexane and ethanol (9:1 by volume) at 40° C. and cooled to 2° C. to yield a precipitate. The precipitate was filtered and dissolved again in the same solvent mixture above, and recrystallized. The collected crystals, 32 g, were found to be pure α-pivalyl-α-(5,5-dimethyl-2,4-oxazolidinedione)-N-{2-chloro-5-[β-(2',4'-t-amylphenoxy)butyramido]phenyl}acetanilide.

The reclaimed coupler above showed the same photographic speed, and the same shelf life without any tendency toward increase in fog and the light fastness of the developed color image was unchanged.

While the invention has been described in detail and with reference to specific embodiments thereof, it will be apparent to one skilled in the art that various changes and modifications can be made therein without departing from the spirit and scope thereof.

What is claimed is:

1. A process for reclaiming a photographic coupler from an aqueous oil-in-water emulsion of a coupler solvent oil having an oil-soluble photographic coupler dissolved therein comprising separating the coupler solvent oil containing the photographic coupler dissolved therein from the aqueous oil-in-water emulsion, and subjecting the separated coupler solvent oil containing the photographic coupler dissolved therein to a high vacuum molecular distillation whereby only the coupler solvent oil is removed as a distillate.

2. The process of claim 1, wherein the photographic coupler is a yellow coupler, a magenta coupler or a cyan coupler.

3. The process of claim 1, wherein the photographic coupler has a molecular weight higher than that of the coupler solvent oil of about 50 or more.

4. The process of claim 1, wherein said coupler solvent oil is a low-volatile organic solvent having a vapor pressure of about 2 mmHg or less at 150° C.

5. The process of claim 4, wherein said coupler solvent oil is an alkyl phthalate, a phosphoric acid ester, a benzoic acid ester, or an alkylamide.

6. The process of claim 1, wherein said aqueous emulsion is an aqueous emulsion of gelatin.

7. The process of claim 1, wherein said separating comprises decomposing any gelatin present, adding a highly volatile organic solvent thereto and then extracting oily components therefrom.

8. The process of claim 1, wherein said high vacuum molecular distillation is accomplished at a vacuum degree ranging from about $10^{-2}$ to about $10^{-6}$ torr.

9. The process of claim 1, wherein said photographic coupler has a molecular weight above about 400, the coupler solvent oil has molecular weight of about 350 or less and the high vacuum molecular distillation is accomplished at a temperature between about 130° and 140° C. at a degree of vacuum of $10^{-3}$ torr.

10. The process of claim 1, wherein said high vacuum molecular distillation is a down-flow thin film molecular distillation or a centrifugal thin film molecular distillation.

* * * * *